Dec. 5, 1950  H. A. STORCH  2,532,743
WEAR STRIP AND FLOOR RING
Filed Dec. 22, 1945
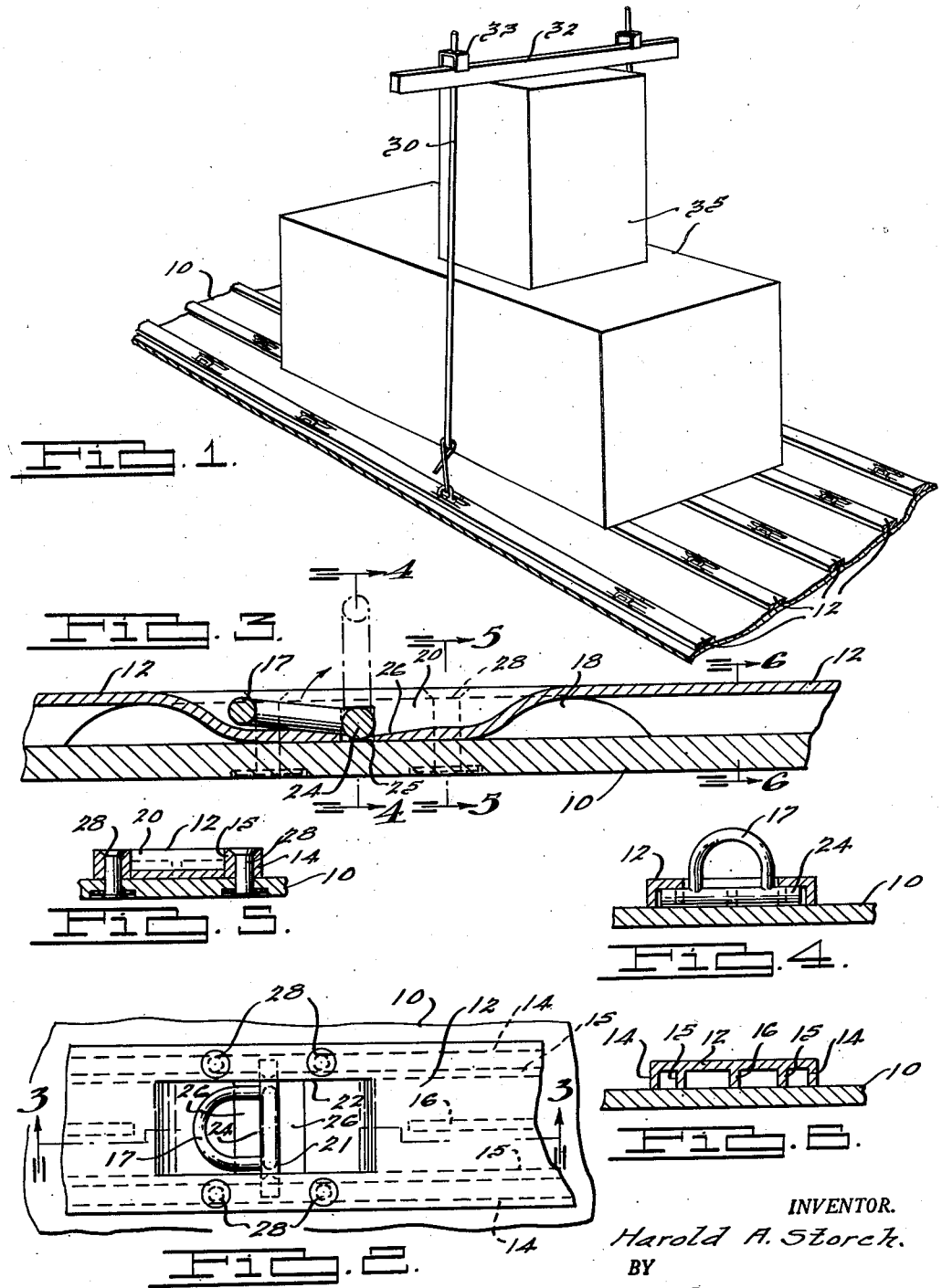
INVENTOR.
Harold A. Storch.
BY
Harness, Dickey & Pierce.
ATTORNEYS.

Patented Dec. 5, 1950

2,532,743

UNITED STATES PATENT OFFICE 2,532,743

WEAR STRIP AND FLOOR RING

Harold A. Storch, Pontiac, Mich., assignor to Evans Products Company, Detroit, Mich., a corporation of Delaware Application December 22, 1945, Serial No. 636,922

14 Claims. (Cl. 248—361)

This invention relates to cargo supporting and fastening devices for aircraft and other vehicles, particularly for use in vehicles of that class wherein it is required that a load be temporarily but firmly held against unwanted shifting or displacement. An important object of the invention is to provide improved combined load fastening, floor reenforcing and skid means having great mechanical strength in proportion to the weight and size thereof, and especially adapted for use in aircraft and other lightly constructed vehicles.

An important object of the invention is to provide an improved skid strip for the floor of an airplane or the like, which strip serves as a load supporting and floor reenforcing element and incorporates novel means for the attachment of hold-down devices whereby the cargo may be fastened against unwanted shifting or displacement. A related object is to provide such hold-down means whereby the cargo may be fastened in a quick and simple manner, by means of apparatus both compact and light in weight, the hold-down means requiring no separate installation and being completely out of the way when not in use.

Another object is to provide novel hold-down means of the character indicated which is pre-assembled with and forms a part of a reenforcing and skid strip, the strip and hold-down means being substituted (preferably in the initial construction of the vehicle) for the conventional skid strips with which the floors of cargo carrying vehicles, such as cargo airplanes, are now commonly provided.

Another object is to provide combined floor skid and hold-down means of very simple and rugged character having no protruding portions which might interfere with free movement of cargo and personnel over the floor when the hold-down means is not in use.

In the drawing:

Fig. 1 is a perspective view of a portion of the floor of a cargo or freight compartment, particularly adapted for package freight and shown as of the type utilized in cargo carrying airplanes, packages being shown secured by means of apparatus constructed in accordance with the present invention;

Fig. 2 is a plan view of a hold-down device constructed in accordance with the present invention, fragmentarily showing a floor and adjacent portions of one of my novel combined skid strip and hold-down devices;

Fig. 3 is a longitudinal sectional view taken substantially on the line 3—3 of Fig. 2 and looking in the direction of the arrows; and, Figs. 4, 5 and 6 are cross-sectional views taken substantially on the lines 4—4, 5—5 and 6—6 respectively of Fig. 3, and looking in the direction of the arrows, Fig. 4 showing the ring in elevated position.

Referring now to the drawings, reference character 10 designates the floor of a carrier, which for the purposes of illustration may be assumed to be the floor of a cargo carrying airplane and is shown as formed of sheet metal. Secured to the floor in spaced parallel longitudinally extending relation and preferably projecting thereabove are a plurality of strips which may be formed of extruded aluminum, magnesium alloy or other suitable material, each strip comprising a smooth-surfaced horizontal top web 12 and a plurality of depending ribs, including side ribs or walls 14, intermediate ribs 15 and a central rib 16, as indicated in cross section in Fig. 5.

It will be noted that the spacing between the outer and intermediate ribs 14, 15, is relatively close. In the areas in which the hold-down rings 17 are to be mounted, the central rib 16 is cut away, as indicated at 18, and the top web 12 is pressed downwardly or otherwise depressed to form a pocket 20 between the ribs 15. In forming the pocket, the top web is transversely cut as indicated at 21, the length of the cut conforming to the distance between the ribs 15, and longitudinal cuts 22 are also formed along the sides of the pocket, extending the desired length of the pocket and aligned with the inner surfaces of the ribs 15. The inner surfaces of the ribs 15 are exposed when the top web portions outlined by the cuts are depressed, and ribs 15 thus form the sides of the pocket.

The hold-down ring assembly is trunnioned in the ribs 15 by means of integral bearing lug portions 24 projecting laterally from the straight, shaft-like bottom portion of the ring assembly. The ring portion, designated at 17, is semicircular. As shown in Figs. 2 and 3, the split ends of the material of the top web formed by the transverse cut 21 are separated by the act of depressing the pocket-forming portions of the web. A gap or deeper slotted section 25 of substantial width is thereby provided to accommodate the shaft section of the ring. The bottom or shaft portion of the ring assembly thus lies substantially at the floor level, while the projecting rounded ring portion per se is freely swingable from the upstanding position in which it is shown in dotted lines in Figs. 3 and 4 to the flat position shown in full lines in Figs. 2 and 3, in which it lies entirely within the pocket. The edges of the depressed portions of the top web 12 adjacent the slot 25 may be tapered as indicated at 26 to provide clearance for the ring when laid flat (Fig. 3). The bearing portions 24 are accommodated in downwardly opening slots 27 in the ribs 15, and the slot 25 is slightly wider than the thickness of the ring. In assembling the parts, therefore, the ring may simply be slipped into place from the bottom, and a portion of the metal of the ribs 15 adjacent the bearing portions 24 may be staked over to prevent dislodgment of the ring assembly prior to installation of the strip, although this is of course a matter of choice.

The entire strip and hold-down assembly is directly secured to the floor, as by means of rivets 28 extending through the top web 12 and between the ribs 14, 15 upon both sides of the pockets. The rivets are preferably located adjacent the hold-down ring portions and beside the pocketed areas 29, as shown in Figs. 2 and 5. The stems of the rivets substantially fill the spaces between the ribs 14, 15, as shown, and accordingly greatly reenforce the structure and provide holding means of great strength adjacent the rings. The rivets are provided with countersunk flat heads, and do not interfere with the effectiveness of the portions of the skid strips which extend beside the pockets.

In those areas in which the rings are not in use, therefore, they present no interference whatever to the sliding of cargo, while separate installation of skid strip and hold-down rings, in the manner now usual, is entirely eliminated.

Supplemental holding devices including upright bars 30, cross members 32 and fasteners 33 (forming no part of my present invention) may be connected to the rings, as shown, to secure the load in place. Packages 35 are shown to typify a held load. It will be apparent, however, that the supplemental holding means, and other features, may be varied without departure from the spirit and scope of the subjoined claims.

I claim:

1. A combined skid strip and hold-down element for package freight and the like, comprising an elongated strip member having a plurality of substantially vertical supporting ribs and a transverse top web connecting said ribs, said top web being relieved at intervals to define pockets extending downwardly between the ribs, and a holding element mounted in each of said pockets, pivoted in the ribs and swingable from a position in which it lies entirely within its pocket to a position in which it projects upwardly for attachment of cargo or the like thereto.

2. A combined wear strip and hold-down element for cargo compartments and the like, comprising an elongated strip member having a transverse top web and a plurality of depending supporting ribs, said top web being relieved in a limited area to define a reentrant pocket extending downwardly between a pair of said ribs, and a holding element mounted in said pocket and having an offset central portion and having end portions pivoted in said ribs, said central portion being swingable from a substantially flat position in the pocket to an upstanding position in which attachment of fastening means thereto can conveniently be made.

3. Means as set forth in claim 1 in which said ribs are arranged in two pairs, the ribs of each pair lying relatively close to the margins of the strip, and said pocket lying between the inner ribs of the two pairs.

4. A combined wear strip and hold-down element for cargo compartments and the like, comprising an elongated strip member having a substantially continuous transverse top web and a plurality of supporting ribs spaced from one another and extending longitudinally therebeneath, one pair of said ribs extending along and relatively close to each edge of the strip, said top web being relieved in an area between the inner ribs of said two pairs of ribs, to define an upwardly opening pocket, and a holding element pivoted in said inner ribs and swingable to and from a position in which it lies within the pocket below the plane of the top web.

5. A combined wear strip and hold-down element for cargo compartments and the like, comprising an elongated strip member having a substantially continuous top web and a plurality of supporting walls spaced from one another and extending longitudinally therebeneath, said top web having depressed portions defining a pocket lying between said walls, and fastening means located in said pocket and attached to said walls.

6. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket and comprising a member pivoted in said walls and swingable from an upstanding position to a position in which it lies below the top plane of the top web.

7. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said strip being adapted to be secured to the floor of such a compartment with the bottoms of said walls bearing upon the floor and the top web elevated thereabove, said walls being slotted upwardly from their free bottom edges toward the top web at corresponding points upon opposite sides of said pocket, said fastening means including a member trunnioned in said slots and accessible from above the top web.

8. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls and fastening means located in said pocket, said top web being depressed in an area between said walls to form said pocket.

9. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said top web being severed to form an opening entirely therethrough constituting at least a part of said pocket, said fastening means comprising a member mounted in said severed portion and movable to lie entirely below the top of the web or to project upwardly therefrom.

10. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said top web being severed to form an opening entirely therethrough constituting at least a part of said pocket.

11. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said top web being severed transversely and longitudinally in a pattern of substantially H-shape and which corresponds generally to the outlines of the pocket and lies between the walls, the tongue-like portions formed by the lines of separation thus defined being depressed to form the bottom and ends of said pocket, and the sides of the pocket being formed by said walls.

12. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said top web being severed transversely and longitudinally in a pattern of substantially H-shape and which corresponds generally to the outlines of the pocket and lies between the walls, the tongue-like portions formed by the lines of separation thus defined being depressed to form the bottom and ends of said pocket, the sides of the pocket being formed by said walls, the ends of said tongue-like portions being separated to form a transverse slot in the bottom of said pocket, said fastening means projecting into said slot.

13. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, and fastening means located in said pocket, said top web being severed transversely and longitudinally in a pattern of substantially H-shape and which corresponds generally to the outlines of the pocket and lies between the walls, the tongue-like portions formed by the lines of separation thus defined being depressed to form the bottom and ends of said pocket, the sides of the pocket being formed by said walls, the ends of said tongue-like portions being separated to form a transverse slot in the bottom of said pocket, said fastening means having pivot portions trunnioned in said walls and at least partly accommodated in said slot, and a bail portion swingable to project upwardly from or to lie within said pocket.

14. A combined wear strip and hold-down element for cargo compartments and the like, comprising an elongated strip member having a substantially continuous top web and a plurality of supporting walls spaced from one another and extending longitudinally therebeneath, said top web having portions defining a pocket lying between said walls, fastening means located in said pocket, additional walls defining side walls of said pocket and spaced inwardly from the first-mentioned walls, said top web extending over the area between said first-mentioned and additional walls upon either side of said pocket, and means extending through the area between said first-mentioned and additional walls and substantially filling the cross-sectional area between said walls for securing said element to the floor of such a compartment.

HAROLD A. STORCH.

REFERENCES CITED

The following references are of record in the file of this patent:

UNITED STATES PATENTS

| Number | Name | Date |
| --- | --- | --- |
| 299,032 | Spruce | May 20, 1884 |
| 1,753,838 | Seeley | Apr. 8, 1930 |
| 2,392,789 | Watter | Jan. 8, 1946 |